(No Model.)
N. H. McGREGOR.
FISH LINE REEL.
No. 522,079.  Patented June 26, 1894.
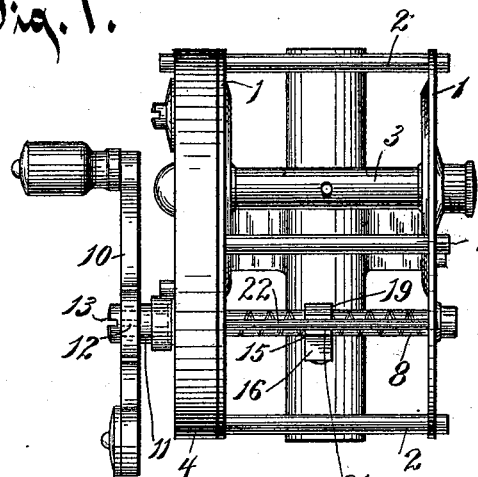
Fig. 1.
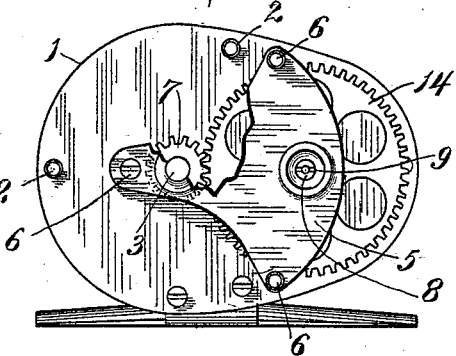
Fig. 2.
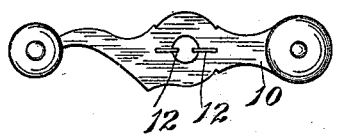
Fig. 6.
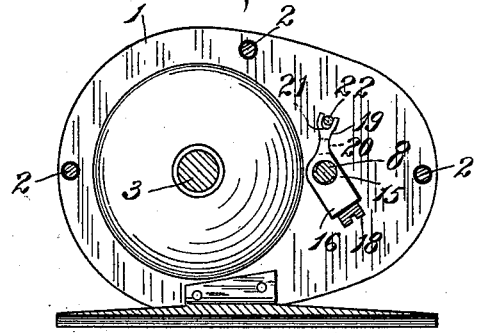
Fig. 3.
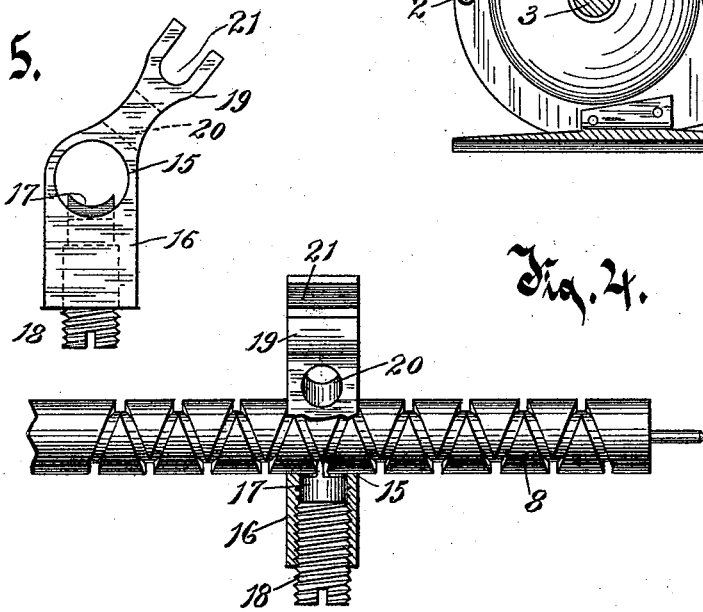
Fig. 5.
Fig. 4.
Witnesses.
Inventor.
Nelson H. McGregor,
By Benedict & Morsell
Attorneys.

UNITED STATES PATENT OFFICE.

NELSON H. McGREGOR, OF MILWAUKEE, WISCONSIN, ASSIGNOR OF ONE-HALF TO CORNELIUS WHEELER, OF SAME PLACE.

FISH-LINE REEL.

SPECIFICATION forming part of Letters Patent No. 522,079, dated June 26, 1894.

Application filed January 29, 1894. Serial No. 498,292. (No model.)

*To all whom it may concern:*

Be it known that I, NELSON H. McGREGOR, of Milwaukee, in the county of Milwaukee and State of Wisconsin, have invented a new and useful Improvement in Fish-Line Reels, of which the following is a description, reference being had to the accompanying drawings, which are a part of this specification.

My invention has relation to improvements in fish line reels, of that class wherein a reversely grooved shaft is employed, in connection with a line guide for the purpose of effecting an even distribution of the fish line on the reel cylinder or shaft, when the line is pulled in.

In fish line reels, as ordinarily constructed, suitable gearing is employed for the purpose of multiplying the speed of rotation of the line cylinder or shaft over that of the hand-crank, and this for the reason that where the line cylinder or shaft rotates at no faster rate of speed than the crank (the rate of rotation of the crank by the hand of the operator being necessarily limited) the line is not pulled in with sufficient rapidity to insure the most successful results in landing the fish.

In the particular class of reels to which my invention appertains, wherein a reverse spirally grooved shaft is employed, it has been a problem heretofore to provide, in connection with such a form of shaft, a simple and efficient gearing whereby not only the spirally grooved shaft is rotated, but at the same time the rate of speed of rotation of the fish line cylinder or shaft is accelerated over that of the crank.

To accomplish the above-named desirable object, and others, my invention consists of certain improvements upon the device described and shown by me in my prior application for Letters Patent, for improvements in fish line reels, filed October 27, 1893, Serial No. 489,327, which said improvements consist of the devices and their parts, as hereinafter described and claimed, or their equivalents.

In the accompanying drawings, Figure 1, is a front elevation of the complete reel. Fig. 2, is an end view with the cap removed, and showing the interior plate partly broken away. Fig. 3, is a central, vertical section. Fig. 4, is a detail view of the reversely grooved shaft, showing the guide partly in section. Fig. 5, is a detail view of the guide, and Fig. 6, is a detail view of the crank.

Like numerals of reference denote like parts throughout the several views.

The reel proper consists of the end pieces 1, 1 the rods 2, 2, 2, securing the end pieces together at a distance from each other, the fish line shaft or cylinder 3 mounted centrally in the end pieces, and a cap piece 4 secured to one of the end pieces. Reels containing substantially the same parts as those thus far specifically described are in common use. A fan-shaped plate 5 is secured to the end piece against which the cap fits, by means of small bolts 6, which hold the plate outward a slight distance laterally from the end piece, so as to leave sufficient space for the reception therebetween of the gear wheels. The fish line shaft 3 projects out laterally beyond the end piece, and has an additional bearing in the plate 5. Between this plate and the end piece, the shaft carries thereon a small pinion 7.

The numeral 8 indicates a reverse spirally grooved shaft, parallel with the shaft 3, and journaled in the end pieces 1, and having one end extending through the end piece, through the plate 5, and through an opening therefor in the cap. The extremity of this shaft which projects through the cap is made tubular, and split transversely, as clearly indicated at 9 in Fig. 2.

The numeral 10 indicates an operating crank, which is provided medially with an inward-projecting sleeve or hub 11, said sleeve or hub provided interiorly, at diametrically opposite points, with splines or feathers 12, 12, which, when the hub or sleeve is adjusted over the tubular end of the grooved shaft, fit into, and register with, the complementary slits 9 of said tubular end of the shaft. For the purpose of securely holding the crank to its adjusted position on the end of the shaft, I provide a screw 13, which passes through the hub of the crank and enters the tubular end of the shaft, and engages the interior threads of said tubular end. By this arrangement, I provide a simple, but yet secure, means for attaching the crank to its shaft, and at the same time a simple and convenient means for detaching the crank from the shaft, which is frequently found necessary when it is desired to remove the cap so as to obtain access to the gears.

Fixed on the grooved shaft 8 between the end piece 1 and the plate 5 is a large gear wheel 14, which meshes with the pinion 7 on the end of the line shaft or cylinder.

It will be seen from the above description that I apply the crank directly to the grooved shaft 8. In some constructions of fish line reels of which I am aware, in which a grooved shaft and a line guide are employed for the purpose of securing an even winding of the line, the crank is secured directly to the line shaft or cylinder, and rotation of the grooved shaft is obtained by a train of intermeshing gears. This form of construction is, of course, objectionable, inasmuch as it is impossible thereby to multiply the speed of the line shaft or reel. Other forms of reels have been devised, employing the grooved shaft and line guide, and also means for multiplying the speed of the line shaft. In these forms, however, almost without exception the object is obtained only by the employment of a complicated arrangement of gearing, the very simplest form requiring at least three gear wheels, one mounted on a short stud or arbor, and the others mounted, respectively, on the line shaft and on the grooved shaft, as is the case with the construction shown and described in my pending application for patent hereinbefore referred to. The present improvements, therefore, obtain far better results than the devices referred to, with but the necessity of employing two gears, viz., a large gear mounted directly on the grooved shaft, and a smaller gear or pinion meshing therewith, mounted on the line shaft or cylinder.

In my pending application for Letters Patent, filed October 27, 1893, Serial No. 489,327, I show and describe a non-revoluble traveling guide, consisting of a band or ring fitted and loose on the grooved shaft, which ring is provided with an apertured lug for the passage therethrough of the fish line, and also provided with a projecting boss, having an aperture to receive a pin, which pin is adapted to ride in the grooves of the shaft. The boss is also adapted to travel along in a way, consisting of a channeled cap. These parts, therefore, I do not claim in this application, as they form the subject-matter of my former application, of October 27, 1893, Serial No. 489,327, above referred to, and are claimed therein. In the present invention I dispense entirely with the channeled cap.

In the drawings filed herewith the ring is shown in detail in Fig. 5, and is indicated by the numeral 15. This ring is provided with the projecting boss 16, which is apertured to receive loosely the block or pin 17, said block or pin having its end projecting through the ring and riding in the grooves of the shaft, the pin being held to its work by means of the screw-plug 18 turning against the pin loosely. From another point of the ring projects a lug 19, provided with a transverse aperture 20 through which the fish line runs when being wound on or unwound from the shaft. The upper end of this lug 19 is recessed, as indicated at 21, in order to adapt it to fit partly around a transverse rod 22. The lug 19, traveling along this rod prevents the ring from rotating on the grooved shaft. The construction of the guide, therefore, in this device differs from the guide shown and described in my pending application for Letters Patent, in adapting a lug projecting from the guide to travel along a transverse rod, thus omitting altogether the feature of the channeled cap. I do not, however, consider that it is absolutely essential to successful results that means should be provided for preventing the ring from turning on the grooved shaft, inasmuch, as, under ordinary circumstances, the tension of the fish line passing through the aperture of the lug will be sufficient to prevent the ring from turning.

It will be understood that in use as the shaft 8 is revolved by the rotation of the crank handle, the guiding ring 15 will be caused to travel longitudinally of the grooved shaft first in one direction, and then in the other, in the usual and well known manner, and that thereby the line running through the apertured lug 19 will be regularly wound back and forth on the shaft 3. At the same time with the turning of the grooved shaft by the manipulation of the crank the large gear wheel 14 carried by the grooved shaft and meshing with the small pinion 7 on the line shaft will cause the rotation of the latter, and at the same time the rate of its rotation over that of the grooved shaft considerably augmented.

Another point of advantage in my device is that in unreeling it is not necessary to throw the gears out of mesh to obtain a free unwinding, as is the case in various forms of fish line reels in which a grooved roller is employed.

Having thus described my invention, what I claim, and desire to secure by Letters Patent, is—

1. In a fish line reel, the combination of a supporting frame, a fish line shaft or cylinder journaled therein, said shaft or cylinder having a pinion fixed thereon, a reverse spirally grooved shaft, having a large gear fixed thereon meshing with the pinion of the line shaft or cylinder, a crank applied directly to the reverse spirally grooved shaft, and a line guide engaging the grooves of the shaft and reciprocated thereby, substantially as set forth.

2. In a fish line reel, the combination, of a supporting frame, a fish line shaft or cylinder, journaled therein said shaft or cylinder having a pinion fixed thereon, a reverse spirally grooved shaft having a large gear fixed thereon meshing with the pinion of the line shaft or cylinder, one end of said shaft provided with slits, a crank provided with feathers adapted to engage the slits, and a line guide engaging the grooves of the shaft and reciprocated thereby, substantially as set forth.

3. In a fish line reel, the combination, of a supporting frame, a fish line shaft or cylinder journaled therein, said shaft or cylinder having a pinion fixed thereon, a reverse spirally grooved shaft having a gear fixed thereon meshing with the pinion of the line shaft or cylinder, one end of the grooved shaft terminating in a tubular slitted portion, a crank provided with an inward-extending hub or sleeve having feathers adapted to engage the slits of the tubular end of the grooved shaft, and a line guide engaging the grooves of the shaft, and reciprocated thereby, substantially as set forth.

4. In a fish line reel, the combination, of a supporting frame, a fish line shaft or cylinder journaled therein, a reverse spirally grooved shaft, a guide rod, a ring loose on the grooved shaft, said ring provided with a projecting apertured finger for the passage therethrough of the fish line, said finger provided with a recessed end fitting the guide-rod, and the ring further provided with a projecting apertured boss, a pin loose in the aperture of the boss, the inner end of said pin adapted to project into and travel in the grooves of the shaft, a gearing for rotating the shafts, and a crank for operating the gearing, substantially as set forth.

In testimony whereof I affix my signature in presence of two witnesses.

NELSON H. McGREGOR.

Witnesses:
ANNA V. FAUST,
ARTHUR L. MORSELL.